Oct. 21, 1969     O. BILZ     3,473,815
QUICK-CHANGE CHUCK WITH ADJUSTABLE TOOL-HOLDING SOCKET
Filed July 11, 1967     3 Sheets-Sheet 1

INVENTOR
OTTO BILZ

BY Dicke & Craig
ATTORNEYS

Oct. 21, 1969     O. BILZ     3,473,815
QUICK-CHANGE CHUCK WITH ADJUSTABLE TOOL-HOLDING SOCKET
Filed July 11, 1967     3 Sheets-Sheet 2

INVENTOR
OTTO BILZ
BY Dickel & Craig
ATTORNEYS

Oct. 21, 1969   O. BILZ   3,473,815
QUICK-CHANGE CHUCK WITH ADJUSTABLE TOOL-HOLDING SOCKET
Filed July 11, 1967   3 Sheets-Sheet 3

INVENTOR
OTTO BILZ

BY Dicke & Craig
ATTORNEYS

United States Patent Office 3,473,815
Patented Oct. 21, 1969

3,473,815
QUICK-CHANGE CHUCK WITH ADJUSTABLE
TOOL-HOLDING SOCKET
Otto Bilz, 8 Vogelsangstrasse,
7302 Nellingen, Germany
Filed July 11, 1967, Ser. No. 652,602
Claims priority, application Germany, July 19, 1966,
B 88,060
Int. Cl. B23b *31/04, 31/10*
U.S. Cl. 279—82                                             8 Claims

ABSTRACT OF THE DISCLOSURE

A quick-change chuck with a hollow cylindrical shank and a tool-holding socket which is inserted into the shank and adapted to be very accurately adjusted by very simple means to different positions in the axial direction relative to the shank.

---

The present invention relates to a quick-change chuck which has a hollow cylindrical shank or housing, and it is an object of the invention to provide such a chuck with an adjusting socket which is adapted to receive and hold a tool and is inserted into the shank and adapted to be adjusted to various positions in the axial direction relative to the shank.

A feature of the present invention which distinguishes this quick-change chuck from those of a known construction consists in the fact that the front part of the adjustable tool socket is provided with a screw thread upon which an adjusting nut is screwed which has a cylindrical neck portion in which a peripheral groove with outwardly inclined flanks is provided into which locking balls are adapted to engage so as to lock the tool socket to the shank in the particular position to which it has been adjusted and to move radially out of this groove when a control sleeve which surrounds and is slidable along the shank and normally maintains the locking balls within the grove is retracted. The neck portion of the adjusting nut in which this groove is provided is slidable within the front end of the tubular shank which is provided with transverse bores in which the locking balls are guided. These transverse bores are spaced peripherally at equal distances from each other and their inner ends are made of a smaller diameter which permit the locking balls to engage into the groove in the adjusting nut but prevent the balls from falling inwardly out of the bores when the socket is removed from the shank. According to one preferred embodiment of the invention, the inner wall of the front part of the control sleeve may flare conically toward its front end where it has such a diameter that, when the control sleeve is fully retracted, the locking balls will fully disengage from the locking groove in the neck portion of the adjusting nut, but will be prevented from falling out of the bores in the shank by the surrounding wider front end of the control sleeve.

The present invention therefore fully attains the object of providing a quick-change chuck into which an adjustable socket may be inserted which is adapted to hold a tool and may be adjusted very accurately and easily to different positions in its axial direcston. This adjustment may be carried out in the most simple manner by turning the adjusting nut in one direction or the other on the threaded end portion of the tool socket so that this nut will then shift the socket in the axial direction to permit the tool which is inserted into this socket to be accurately adjusted to the desired position. The adjusting nut may then be locked in a fixed position by different means, for example, by means of an additional lock nut. A very important advantage which is attained by the invention is the fact that the tool which is mounted in the quick-change chuck may be adjusted very accurately to any desired position within a very short time and without requiring any complicated means. Another great advantage of the invention is the fact that this adjustable quick-change chuck may be manufactured very easily, economically, and at a low cost.

Another feature of the invention according to another embodiment thereof consists in providing between the control sleeve and the shank a separate guide or locking sleeve which has on its front end an annular neck portion of a smaller diameter which forms an internal shoulder which abuts against the front end surface of the shank. This neck portion of the guide sleeve surrounds the neck portion of the adjusting nut and is provided with the bores in which the locking balls are guided. Near its rear end, the guide sleeve is provided with a bore into which a set screw is inserted which is screwed into the shank and locks the guide sleeve in a fixed position to the shank. In accordance with the reduced diameter of the neck portion of the guide sleeve, the control sleeve which is slipped over the guide sleeve and is drawn toward the rear thereof by a spring is provided on its front end with an inwardly projecting annular flange the inner surface of which is tapered toward the front and forms a contact surface which under the action of the spring presses the locking balls into the peripheral groove in the neck portion of the adjusting screws.

The quick-change chuck which is designed according to the invention has the additional advantage that it permits any standard shank to be employed practically without change so as to attain the advantages as previously described. It is therefore no longer necessary to produce a shank of a special design for such a quick-change chuck but it is possible to employ any shank of a standard design. The screws which are screwed from the side into such a standard shank for preventing the adjustable socket from being withdrawn then serve for securing the guide sleeve in a fixed position on the shank between the latter and the control sleeve. The guide sleeve together with the control sleeve thereon, the adjusting nut and the locking balls then form a structural unit which may simply be slipped over a shank of a standard type.

These and additional features of the invention will become more clearly apparent from the following detailed description thereof which is to be read with reference to the accompanying diagrammatic drawings, in which:

FIGURE 6 shows a longitudinal section of a quick-change chuck according to a further modification of the invention with the adjustable socket inserted into the shank; while

Figure 1:
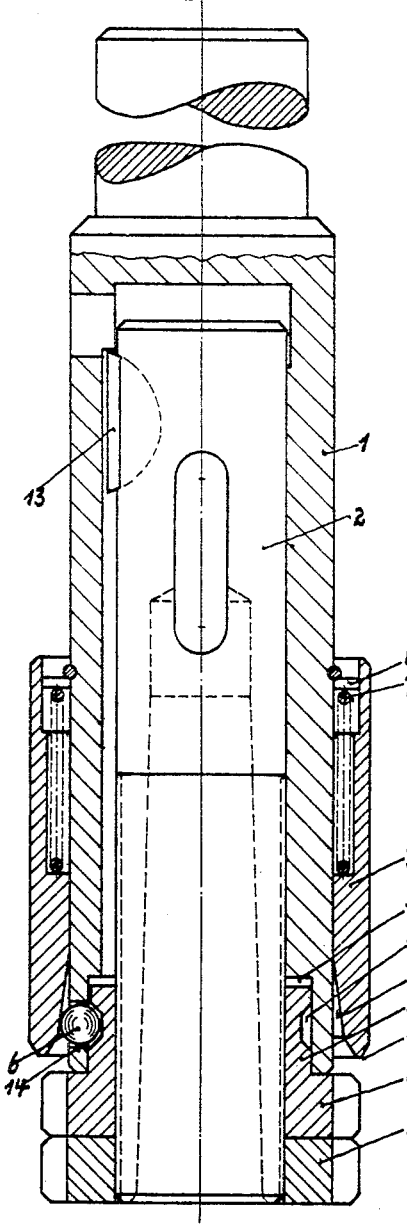
FIGURE 1 shows a longitudinal section of a quick-change chuck according to the invention with an adjustable tool socket inserted into the shank.
Figure 2:
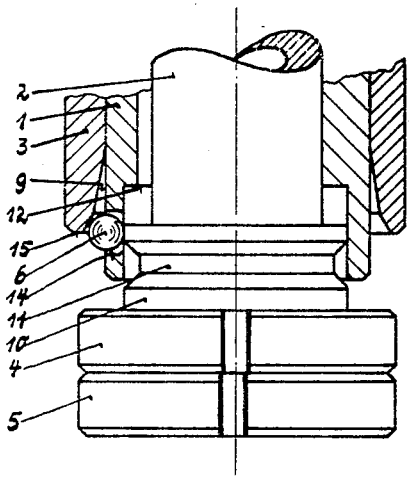
FIGURE 2 shows a view of the lower part of FIGURE 1 in a position during the insertion of the adjustable socket.
Figure 3:
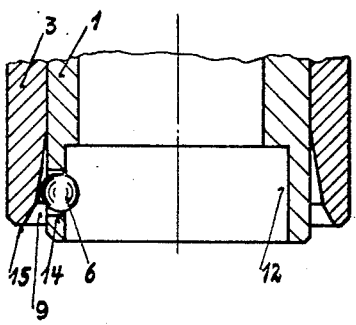
FIGURE 3 shows a view of the lower part of FIGURE 1, but without the adjustable socket.

Referring first to FIGURES 1 to 3 of the drawings, the quick-change chuck according to the invention comprises a hollow cylindrical shank or housing 1 into which an adjustable tool-holding socket 2 may be inserted which is nonrotatably connected thereto but slidable in the axial direction therein by means of a spline 13 which is slidable within an associated longitudinal groove in the inner wall of shank 1. On its outer side, shank 1 carries a control sleeve 3 which is acted upon by a compression spring 7 one end of which rests on an internal shoulder in sleeve 3, while its other end rests on a stop ring 8 which is held in a fixed position on shank 1 by a spring ring. Control sleeve 3 may therefore be pulled back by hand in the axial direction along shank 1 against the action of the compression spring 7.

Upon the front end of the tool socket 2 an adjusting nut 4 is screwed which may be locked in the particular position to which it is adjusted by a lock nut 5. The adjusting screw 4 has a cylindrical neck 10 which is slidable within a recess 12 in the front end of shank 1 and is also provided with a peripheral groove 11 with outwardly inclined flanks.

Near its front end, shank 1 is provided with a plurality of transverse bores 14 which are spaced at equal distances from each other and in each of which a locking ball 6 is guided which engages at one side into the groove 11 of the adjusting nut 4 and at the other side upon a conical inner wall 9 the diameter of which increases toward its outer end and terminates into an outwardly flaring portion adjacent to the end 15 of sleeve 3.

When the adjustable tool socket 2 is inserted into shank 1, the locking balls 6 are pressed radially toward the inside by the tapered wall 9 of the spring supported control sleeve 3 until they engage tightly upon the bottom of the peripheral groove 11 in the adjusting nut 4. Socket 2 may therefore be easily and accurately adjusted at any time to any desired position in its axial direction relative to the shank 1 by the adjusting nut 4.

When the control sleeve 3 is drawn back by hand, the locking balls 6 may move radially toward the outside and out of the peripheral groove 11 so that the tool socket 2 may then be withdrawn and removed from the shank 1. If the quick-change chuck is held in a vertical position as shown in FIGURE 1, the locking balls 6 will drop out due to the weight of socket 2 and to the outwardly inclined flanks of the peripheral groove 11. When socket 2 is being inserted into shank 1 in the manner as illustrated in FIGURE 2, the locking balls 6 will engage upon the flaring end portion of the tapered wall 9 adjacent to the end 15 of the retracted sleeve 3 until the peripheral groove 11 is at the same level as the balls 6 and the control sleeve 3 is moved forwardly by spring 7 and the tapered wall 9 presses the locking balls 6 radially into the groove 11.

In order to prevent the locking balls 6 from falling out of the bores 14 in shank 1 either inwardly or outwardly, those bores are slightly narrower at the inner ends, for example, by not being drilled through entirely so that a small inner edge of a smaller diameter remains which permits the ball to move far enough inwardly to engage into groove 11 without, however, being able to fall out inwardly when the adjustable socket 2 is entirely removed, as shown in FIGURE 3. The control sleeve 3 may be drawn back by hand so far that its front edge 15 or the adjacent flared part of wall 9 will just remain in engagement with the locking balls 6, although they will move radially outwardly sufficiently so as not to interfere with the insertion of the adjusting nut 4.

The present invention therefore permits an adjustable tool-carrying socket to be very easily and accurately adjusted within a quick-change chuck without any complicated means, and it also insures that the locking balls 6 may carry out their required radial movements without interference. These radial movements of the locking balls are controlled by the control sleeve 3 and are assisted by the conical flanks of the peripheral groove in the adjusting nut 4.

Figure 4:
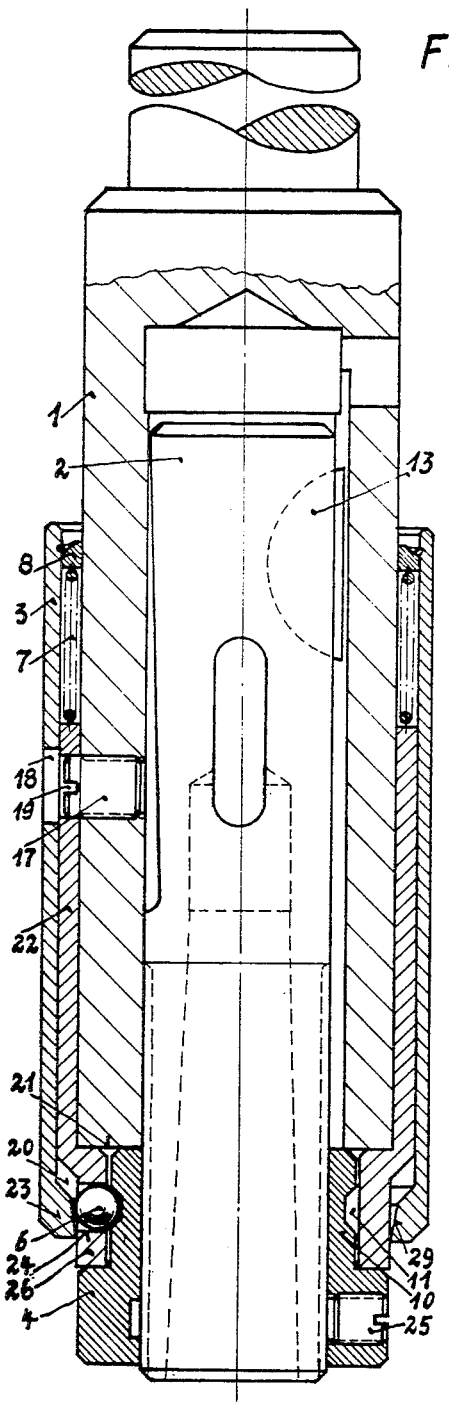
FIGURE 4 shows a longitudinal section of a quick-change chuck according to a modification of the invention with an adjustable socket inserted into the shank.
Figure 5:
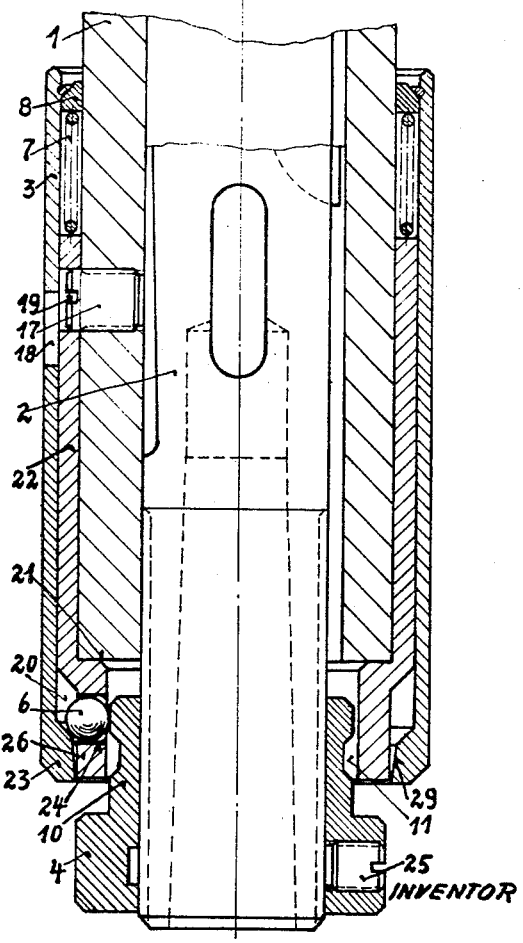
FIGURE 5 shows the lower part of FIGURE 4 in a position while the adjustable socket is being removed.

FIGURES 4 and 5 illustrate another embodiment of the invention, in which the adjustable socket 2 into which a tool may be inserted is likewise slidable in the axial direction within the shank 1 and nonrotatably connected thereto by a spline 13 which is slidable within a longitudinal groove in the inner wall of shank 1. The modification over the first embodiment of the invention as shown in FIGURES 1 to 3 consists among others in the provision of a guide or locking sleeve 22 which is slipped over the shank 1 and the front end of which is provided with an inner tubular projection or neck portion 26 of a smaller inner diameter which engages upon the end surface 21 of shank 1. Near its rear end, guide sleeve 22 is locked to shank 1 by a setscrew 17 which is inserted through a transverse bore 19 in this sleeve and screwed into shank 1 so as to prevent it from being withdrawn from the shank. This locking screw 17 is provided in place of the screw which usually prevents a conventional adjustable tool socket from being pulled out of shank 1 by engaging with the inclined flat part as indicated in the drawings. For sliding the guide sleeve 22 over the shank 1 and securing it thereto, it is therefore not necessary to modify a shank of a standard construction.

The locking balls 6 are mounted in transverse bores 24 in the neck 26 of guide sleeve 22 and engage into the annular groove 11 in the cylindrical neck 10 of the adjusting nut 4. This adjusting nut 4 is screwed upon the socket 2 and may be locked in any position to which it is adjusted by a setscrew 25.

The transverse bores 24 in the neck portion 26 of guide sleeve 22 are made of a smaller diameter at their inner ends in the same manner as in the embodiment according to FIGURES 1 to 3 so as to permit the locking balls 6 to engage into the annular groove 11, but to prevent them from falling out of the bores 24 inwardly when the tool socket is removed.

The control sleeve 3 which is acted upon by the spring 7 is slipped over the guide sleeve 22 and provided on its front end with an inwardly projecting flange 23 which surrounds the neck portion 26 of sleeve 22 and has a conical inner contact surface 29 for its engagement with the locking balls 6. In its rear part, control sleeve 3 is provided with a bore 18 through which the setscrew 17 may be inserted and turned by a screw driver.

Behind its slightly conical contact surface 29 the inner flange 23 on the control sleeve 3 merges by an intermediate part of a larger inclination with the cylindrical inner surface of the control sleeve and defines with the latter and the neck portion 26 of guide sleeve 22 a chamber 20 which serves for receiving the locking balls 6 when the control sleeve 3 is pushed forwardly against the action of the compression spring 7. In this position of the control sleeve, the locking balls 6 therefore move outwardly and out of the annular groove 11 so that the adjusting nut 4 together with the tool socket 2 may be easily withdrawn from the shank 1 or will drop out of it by gravity.

The compression spring 7 for the control sleeve 3 acts at one end upon the stop ring 8 near the rear end of sleeve 3 and at the other end upon the rear end of guide sleeve 22. This spring 7 is adapted to retract the control sleeve 3 so far until the inclined contact surface 29 has pressed the locking balls 6 radially toward the inside and into engagement with the bottom wall of groove 11. In this position, the tool socket 2 is then maintained in its axial direction by the adjusting nut 4 which is locked to the socket 2 by the setscrew 25. The actual axial adjustment of the tool socket 2 is carried out in the same manner as described with reference to FIGURES 1 to 3 by screwing the adjusting nut 4 in one direction or the other along socket 2.

Figure 6:
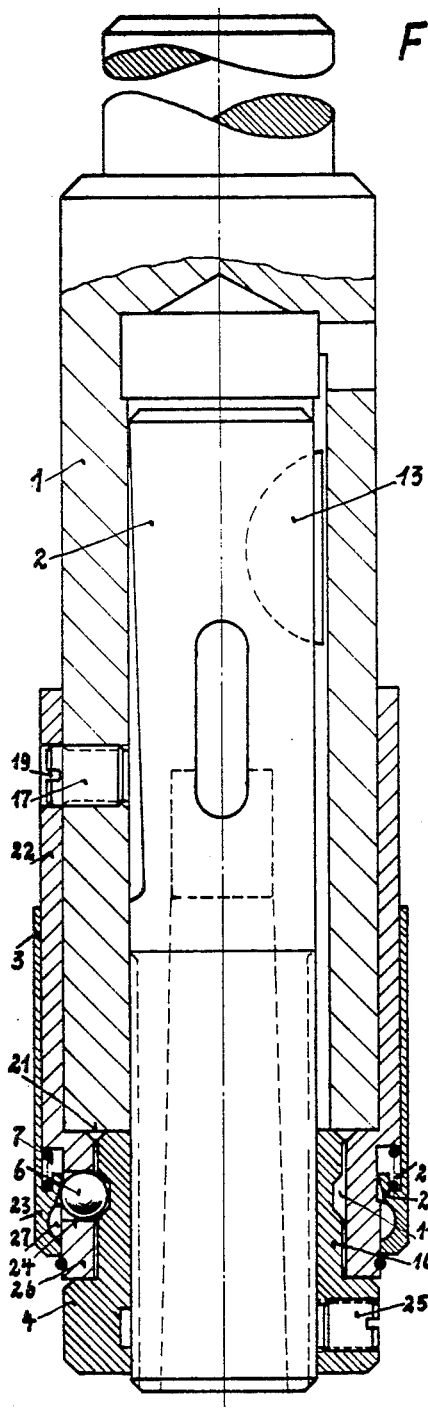
Figure 7:
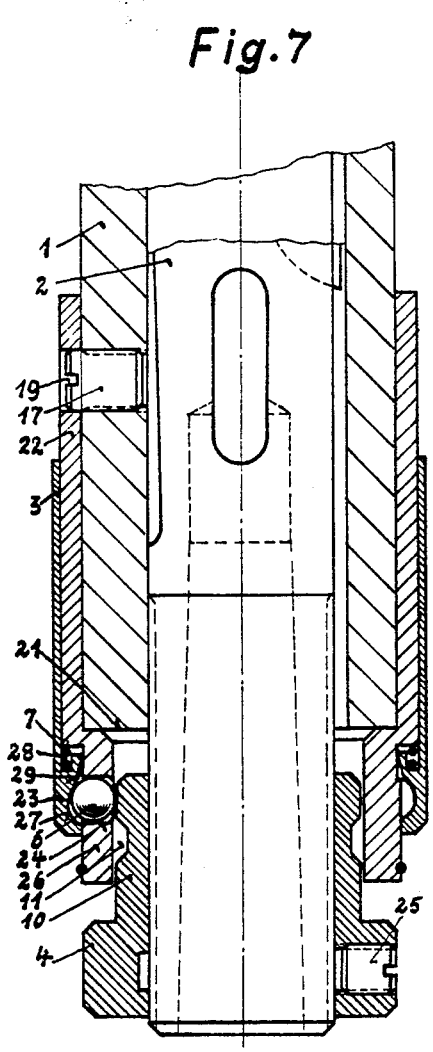
FIGURE 7 shows the lower part of FIGURE 6 in a position while the adjustable socket is being removed.

FIGURES 6 and 7 illustrate a further embodiment of the invention which is generally of the same construction as the embodiment according to FIGURES 4 and 5, except that the control sleeve 3 has a shorter length and the compression spring 7 is inserted into the annular chamber between the shoulder on the inner flange 23 of the control sleeve 3 and the shoulder between the neck portion 26 and the cylindrical outer surface of the guide sleeve 22. In order to increase the length of this chamber and to guide the compression spring 7, an annular recess 28 may be cut into flange 23 into which the front end of spring is inserted.

The embodiment according to FIGURES 6 and 7 differs further from that according to FIGURES 4 and 5 by the fact that the conical contact surface 29 of the control sleeve 3 is not tapered toward its front end but toward the rear and its wider front end terminates into an annular groove 27 with a rounded bottom which is adapted to receive the locking balls 6 when the control sleeve 3 is retracted. Consequently, when the control sleeve 3 is retracted against the action of spring 7, the locking balls 6 may move outwardly into groove 27 and will thus permit the tool socket 2 to be withdrawn from the shank 1 or to drop out of it by its own gravity. In their normal position, the locking balls 6 are pressed by the inclined contact surface 29 radially into the annular groove 11 under the action of spring 7 and then secure the tool socket 2 in the shank 1 in the particular position to which it has been adjusted.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A quick-change chuck comprising a cylindrical shank having a tubular wall, a tool socket axially slidable within said shank and adapted to receive a tool, an adjusting nut adapted to be screwed upon the front end of said socket for shifting said socket in its axial direction relative to said shank, said nut having a cylindrical neck portion and a peripheral groove within said neck portion, said groove having outwardly inclined flanks, a plurality of locking balls movable substantially radially into and out of said groove, and a spring-biased control sleeve guiding the radial motoin of said balls, and further comprising a guide sleeve fitted over said shank and, in turn, surrounded by said control sleeve, said guide sleeve having, on its front end, an annular neck, of a smaller diameter, forming an inner shoulder adapted to abut against the front end of said shank, wherein said balls are disposed.

2. A quick-change chuck as defined in claim 1, wherein said neck of said guide sleeve has a plurality of transverse bores therein, each adapted to hold and guide one of said locking balls, said neck portion of said adjusting nut being rotatable within said neck and being slidable into and out of said neck when said locking balls are removed from said groove, and means for securing said guide sleeve in said abutting position of said shoulder to said shank.

3. A quick-change chuck as defined in claim 2, wherein said shank has a tapped bore and said guide sleeve has a bore in alignment with said tapped bore when said shoulder on said guide sleeve abuts against the front end of said shank, said securing means comprising a setscrew inserted into said bore in said guide sleeve and screwed into said tapped bore for locking said guide sleeve to said shank.

4. A quick-change chuck as defined in claim 2, wherein said control sleeve has an inwardly projecting annular flange on its front end having a conical inner contact surface tapering forwardly and surrounding said neck of said guide sleeve containing said bores with said locking balls therein, and spring means acting upon said control sleeve and tending to move the same toward the rear to a position in which said contact surface presses said balls into said groove.

5. A quick-change chuck as defined in claim 4, wherein said control sleeve is shifted forwardly against the action of said spring means, an annular chamber is formed between said guide sleeve and its annular neck, said chamber being adapted to receive said locking balls when said control sleeve is shifted forwardly.

6. A quick-change chuck as defined in claim 4, further comprising a stop ring secured to the inner wall of said control sleeve near the rear end thereof, said control sleeve having a greater length than said guide sleeve and projecting beyond the rear end of the latter, said spring means comprising a compression spring having one end pressing against said stop ring and another end pressing against the rear end surface of said guide sleeve.

7. A quick-change chuck as defined in claim 2, wherein said control sleeve has an inwardly projecting annular flange on its front end surrounding said neck of said guide sleeve and having a conical surface increasing in diameter toward the front and terminating into an annular groove having a rounded bottom for receiving said locking balls when said control sleeve is retracted, and spring means acting upon said control means and tending to shift the same forwardly so that said conical surface will press said locking balls into said groove.

8. A quick-change chuck as defined in claim 7, wherein an annular chamber is formed between said flange on said control sleeve and an outer shoulder formed between said guide sleeve and its annular neck, said spring means comprising a compression spring within said chamber and having one end pressing against said flange and another end pressing against said neck.

References Cited
UNITED STATES PATENTS

| 2,395,534 | 2/1946 | Cook | 279—82 |
| 2,860,883 | 11/1958 | Better et al. | 279—83 |
| 2,926,020 | 2/1960 | Dayton et al. | 279—75 |
| 2,970,844 | 2/1961 | Better | 279—75 |

ROBERT C. RIORDON, Primary Examiner